(12) United States Patent
Amano et al.

(10) Patent No.: US 10,550,736 B2
(45) Date of Patent: Feb. 4, 2020

(54) VALVE OPENING AND CLOSING TIMING CONTROL APPARATUS

(71) Applicant: AISIN SEIKI KABUSHIKI KAISHA, Kariya-shi, Aichi (JP)

(72) Inventors: Hiroyuki Amano, Kariya (JP); Masaki Kobayashi, Okazaki (JP); Yoshiaki Yamakawa, Toyota (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 7 days.

(21) Appl. No.: 15/558,091

(22) PCT Filed: Sep. 25, 2015

(86) PCT No.: PCT/JP2015/077089
§ 371 (c)(1),
(2) Date: Sep. 13, 2017

(87) PCT Pub. No.: WO2016/151897
PCT Pub. Date: Sep. 29, 2016

(65) Prior Publication Data
US 2018/0051599 A1 Feb. 22, 2018

(30) Foreign Application Priority Data
Mar. 23, 2015 (JP) .................................. 2015-059588

(51) Int. Cl.
*F01L 1/356* (2006.01)
*F01L 1/344* (2006.01)
(Continued)

(52) U.S. Cl.
CPC ............ *F01L 1/356* (2013.01); *F01L 1/3442* (2013.01); *F16K 31/06* (2013.01); *F16K 31/105* (2013.01);
(Continued)

(58) Field of Classification Search
None
See application file for complete search history.

(56) References Cited

U.S. PATENT DOCUMENTS

| | | |
|---|---|---|
| 2003/0121486 A1 | 7/2003 | Komazawa et al. |
| 2004/0112314 A1 | 6/2004 | Kanada et al. |
| 2010/0139592 A1 | 6/2010 | Takemura |

FOREIGN PATENT DOCUMENTS

| | | |
|---|---|---|
| JP | 2003-172109 A | 6/2003 |
| JP | 2006-170024 A | 6/2006 |

(Continued)

OTHER PUBLICATIONS

International Search Report (PCT/ISA/210) dated Nov. 24, 2015, by the Japanese Patent Office as the International Searching Authority for International Application No. PCT/JP2015/077089.
(Continued)

*Primary Examiner* — Mark A Laurenzi
*Assistant Examiner* — Wesley G Harris
(74) *Attorney, Agent, or Firm* — Buchanan Ingersoll & Rooney PC

(57) ABSTRACT

A valve opening and closing timing control apparatus includes a drive-side rotational body, a driven-side rotational body, an intermediate lock mechanism which selectively switches between a lock state where displacement of a relative rotational phase of the driven-side rotational body relative to the drive-side rotational body is restrained in an intermediate lock phase and an unlock state where the lock state is released, and an electromagnetic valve. At a time of predetermined operation of an internal combustion engine, a value of the drive current is set as a boundary current, and the value of the drive current to be set as the boundary current differs, by a predetermined value, from a value of the (Continued)

drive current at a time when the unlock state was switched to the lock state due to the change of the drive current.

7 Claims, 7 Drawing Sheets

(51) Int. Cl.
*F16K 31/06* (2006.01)
*F16K 31/10* (2006.01)

(52) U.S. Cl.
CPC ... *F01L 2001/3443* (2013.01); *F01L 2800/00* (2013.01); *F01L 2800/01* (2013.01); *F01L 2800/09* (2013.01)

(56) References Cited

FOREIGN PATENT DOCUMENTS

| | | | |
|---|---|---|---|
| JP | 2008-255914 A | 10/2008 | |
| JP | 2016180318 A * | 10/2016 | ............ F01L 1/356 |
| WO | WO-2016151897 A1 * | 9/2016 | ............ F01L 1/356 |

OTHER PUBLICATIONS

Written Opinion (PCT/ISA/237) dated Nov. 24, 2015, by the Japanese Patent Office as the International Searching Authority for International Application No. PCT/JP2015/077089.
Notification of Transmittal of Translation of the International Preliminary Report on Patentability (Forms PCT/IB/338 and PCT/IB/373) and the Written Opinion of the International Searching Authority (Form PCT/ISA/237) dated Sep. 26, 2017, in the corresponding International Application No. PCT/JP2015/077089. (9 pages).

\* cited by examiner

| Drive current | 0 | | | | Maximum |
|---|---|---|---|---|---|
| Lock discharge flow passage | Drain | | Close | | Drain |
| Advanced-angle flow passage | Drain | | Close | | Supply |
| Retarded-angle flow passage | Supply | | Close | | Drain |
| Unlock flow passage | Drain | | Supply | | Close |
| Position of spool | W1 | W2 | W3 | W4 | W5 |

VALVE OPENING AND CLOSING TIMING CONTROL APPARATUS

TECHNICAL FIELD

The present invention relates to a valve opening and closing timing control apparatus which controls a relative rotational phase of a driven-side rotational body relative to a drive-side rotational body rotating synchronously with a crankshaft of an internal combustion engine.

BACKGROUND ART

Recently, a valve opening and closing timing control apparatus which can change an opening and closing timing of an intake valve and an exhaust valve in accordance with an operation state of an internal combustion engine (which will be also referred to as "engine") has been in practical use. For, example, the valve opening and closing timing control apparatus includes a mechanism which changes the opening and closing timing of the intake and exhaust valve opened and closed in association with rotations of the driven-side rotational body, by changing a relative rotational phase (which will be hereinafter referred to also simply as "a relative rotational phase") of the driven-side rotational body relative to rotations of the drive-side rotational body rotated by the operation of the engine.

Generally, the optimum opening and closing timing of the intake and exhaust valve differs depending on the operation state of the engine, for example, at a start-up of the engine and/or during driving of the vehicle. At the start-up of the engine, the relative phase is restrained or kept at a predetermined phase which is between the most retarded-angle phase and the most advanced-angle phase, and thus the optimum opening and closing timing of the intake and exhaust valve that is most suitable for the start-up of the engine is realized and striking noise is restricted from occurring, the striking noise which is generated by oscillation of a partition portion of a fluid pressure chamber formed by the drive-side rotational body and the driven-side rotational body. Accordingly, it is desired that the relative rotational phase is restrained at the predetermined phase before the engine is stopped.

Patent document 1 discloses a valve opening and closing timing control apparatus which can lock a relative rotational phase in an intermediate lock phase on the basis of a stop signal of an engine. According to the valve opening and closing timing control apparatus, one hydraulic control valve (electromagnetic valve) performs an advanced-angle control, a retarded-angle control, an intermediate phase retention control, a lock control in an intermediate lock phase. These controls are performed by changing a position of a spool of the hydraulic control valve in accordance with a drive current (an electricity supply amount) which is applied to an electromagnetic solenoid. Specifically, FIG. 6 of Patent document 1 discloses (1) a case where control is performed such that four states are switched to one another when the drive current is changed from 0 to the maximum extent, the four states which are "completely drained", "lock to the intermediate lock phase by an advanced-angle operation", "the advanced-angle operation in a state of being unlocked", "the intermediate phase being held" and "a retarded-angle operation in a state of being unlocked". FIG. 6 of Patent document 1 also discloses (2) a case where control is performed such that four states are switched to one another when the drive current is changed from 0 to the maximum extent, the four states which are "the retarded-angle operation in a state of being unlocked", "the intermediate phase being held", "the advanced-angle operation in a state of being unlocked", "lock to the intermediate lock phase by the advanced-angle operation" and "completely drained".

In addition, FIG. 21 of Patent document 1 discloses a case where control is performed such that five states are switched to one another when the drive current is changed from 0 to the maximum extent, the five states which are "lock to the intermediate lock phase by the retarded-angle operation", "retarded-angle operation in the unlocked state", "the intermediate phase being held", "the advanced-angle operation in the unlocked state" and "lock to the intermediate lock phase by the advanced-angle operation".

DOCUMENT OF PRIOR ART

Patent Document
    Patent document 1: JP2003-172109A

OVERVIEW OF INVENTION

Problem to be Solved by Invention

A general valve opening and closing timing control apparatus includes two electromagnetic valves which are an electromagnetic valve performing a phase control including an advanced-angle control, a retarded-angle control and an intermediate phase retaining, and another electromagnetic valve performing a lock control including locking and unlocking in an intermediate lock phase. Thus, at each of the electromagnetic valves, a control is performed which switches three states to one another or two states to each other. Accordingly, at each of the electromagnetic valves, a movable range of a spool is easily allotted to a position of each phase control or each lock control. Also, a control performance can be enhanced by widening or broadening a range of a drive current which can maintain one of the states. Also, the phase control and the lock control are performed by the respective electromagnetic valves that are independent from each other, and thus the state is not mistakenly switched a lock state while the phase is being displaced in an unlocked state, for example.

On the other hand, at the valve opening and closing timing control apparatus disclosed in Patent document 1, one hydraulic control valve performs a control to switch the above-described four or five states to one another, and thus a control position of a spool and a range of a drive current which can maintain each state are narrow. Consequently, in each of the states, a control range of the drive current is widened or extended to a neighborhood of an adjacent state so that the control performance is enhanced as much as possible. On the other hand, the upper limit and the lower limit of the drive current of each state, that is, a value of the drive current which is near the boundary between the adjacent state and is able to maintain the current state (which will be hereinafter referred to as a boundary current) is generally set only at the time of manufacture of a vehicle and is not changed thereafter. Also, the boundary current may change due to reasons including changes in external environment and/or deterioration of the hydraulic control valve itself.

Because of the structure of the hydraulic control valve, "lock to the intermediate lock phase by the retarded-angle operation" and "the retarded-angle operation in a state of being unlocked" are the states that are adjacent to each other. "Lock to the intermediate lock phase by the advanced-angle operation" and "the advanced-angle operation in a state of being unlocked" are the states that are adjacent to each other. Accordingly, in a case where the control range of the drive current is widened to the neighborhood of the boundary between the adjacent states, if the boundary current of "the retarded-angle operation in a state of being unlocked" and/or the boundary current of "the advanced-angle operation in a state of being unlocked" changes due to the above-described reasons, the state may be switched to "lock to the intermediate lock phase by the retarded-angle operation" and/or "lock to the intermediate lock phase by the advanced-angle operation" in spite that the boundary current value of "the retarded-angle operation in a state of being unlocked" and/or "the advanced-angle operation in a state of being unlocked" which is set at the time of manufacture of the vehicle is applied to the electromagnetic solenoid. In this case, locking at the intermediate lock phase occurs during the advanced-angle operation and/or the retarded-angle operation. As described above, in a case where the hydraulic control valve performing the control switching among the four or five states to one another is applied to the valve opening and closing timing control apparatus, there remains room for a further improvement related to the setting of the boundary current.

As described above, a valve opening and closing timing control apparatus which can re-set a boundary current during the operation of an engine is required.

Means for Solving Problem

In order for solving the above-described problems, a characteristic configuration of a valve opening and closing timing control apparatus related to the present invention is that the valve opening and closing timing control apparatus includes a drive-side rotational body which rotates synchronously with a drive shaft of an internal combustion engine, a driven-side rotational body which is arranged at an inner side of the drive-side rotational body to be coaxial with an axis of the drive-side rotational body and rotates integrally with a camshaft for valve-opening-and-closing of the internal combustion engine, an intermediate lock mechanism which selectively switches between a lock state where displacement of a relative rotational phase of the driven-side rotational body relative to the drive-side rotational body is restrained by an operating oil supplied in an intermediate lock phase existing between a most advanced-angle phase of the relative rotational phase and a most retarded-angle phase of the relative rotational phase, and an unlock state where the lock state is released, and an electromagnetic valve at which a position of a spool is changed when a drive current applied to a drive source changes, and the operating oil is selectively supplied or discharged in accordance with the position of the spool such that the relative rotational phase is displaced in an advanced-angle direction or a retarded-angle direction, the electromagnetic valve selectively switching the supply and discharge of the operating oil to and from the intermediate lock mechanism. At a time of predetermined operation of the internal combustion engine, a value of the drive current is configured to be set as a boundary current, the value of the drive current to be set as the boundary current differs, by a predetermined value, from a value of the drive current at a time when the unlock state was switched to the lock state due to the change of the drive current, and the value of the drive current to be set as the boundary current maintains the unlock state.

With the above-described characteristic configuration, at the time of predetermined operation of the internal combustion engine, the value of the drive current is set as the boundary current. The value of the drive current which is set as the boundary current differs, by the predetermined value, from the value of the drive current at the time when the unlock state is switched to the lock state due to the change of the drive current, and the value of the drive current which is set as the boundary current maintains the unlock state. Consequently, even in a case where changes has occurred to the drive current (the boundary current) at which the unlock state is switched to the locked state because of reasons including change in external environment and/or deterioration of the electromagnetic valve, the drive current, which can maintain the unlock state as near the drive current as possible at which the state is switched to the lock state, can be set as the boundary current. As a result, control of switching among plural states of the electromagnetic valve can be performed reliably.

At the valve opening and closing timing control apparatus related to the present invention, it is ideal that the drive current is changed in such a manner that an advanced-angle displacement and a retarded-angle displacement occur alternately with each other, the relative rotational phase is displaced in the advanced-angle direction across the intermediate lock phase in the advanced-angle displacement, and the relative rotational phase is displaced in the retarded-angle direction across the intermediate lock phase in the retarded-angle displacement.

With the above-described characteristic configuration, by displacing or changing the relative rotational phase by changing the drive current so that the advanced-angle displacement and the retarded-angle displacement occur alternately with each other, setting of the boundary current at a retarded-angle-side and setting of the boundary current at an advanced-angle-side can be performed in a parallel way, and accordingly a time period until the settings are completed can be reduced compared to a case in which each setting is independently performed.

At the valve opening and closing timing control apparatus related to the present invention, it is ideal that in a case where at least one of the advanced-angle displacement and the retarded-angle displacement occurs a plurality of times, the values of the drive current when being displaced in a same direction twice consecutively are set in such a manner that a latter value of the drive current is closer to the value of the drive current at which the state is switched to the lock state, than a former value of the drive current.

With the above-described configuration, every time the drive current is repetitively applied, the value becomes closer to the value at which the state is switched to the lock state. Accordingly, ranges of the drive current in which the retarded-angle operation and the advanced-angle operation can be performed in the unlock state are widened or increased, thereby enhancing a control performance of the electromagnetic valve.

At the valve opening and closing timing control apparatus related to the present invention, it is ideal that in a case where the state is switched to the lock state at a time of either the advanced-angle displacement or retarded-angle displacement, a value of the drive current which is to be applied subsequently at a time of displacement in the direction in which the state is switched to the lock state corresponds to the boundary current.

With the above-described configuration, even in a case where the boundary current of either one of the advanced-angle displacement and the retarded-angle displacement is set first, the boundary current of the other displacement can be set by displacing the relative rotational phase by changing the drive current to generate the advanced-angle displacement and the retarded-angle displacement alternately with each other.

At the valve opening and closing timing control apparatus related to the present invention, it is ideal that the time of predetermined operation corresponds to a time of start-up of the internal combustion engine.

With the above-described configuration, the boundary current can be set at the start-up of the internal combustion engine, and accordingly the drive current, which can always maintain the unlock state in the vicinity of the drive current at which the state is switched to the lock state, can be set as the boundary current. As a result, control of switching among plural states of the electromagnetic valve can be reliably performed.

At the valve opening and closing timing control apparatus related to the present invention, it is ideal that the time of predetermined operation corresponds to a time when the state is switched to the lock state even though the drive current which maintains the unlock state is applied.

With the above-described configuration, in a case where the state is switched to the lock state in a different way from the driver's intention, the valve opening and closing timing control apparatus can be operated in accordance with the driver's intension by newly setting the boundary current.

At the valve opening and closing timing control apparatus related to the present invention, it is ideal that the predetermined value in a case where the time of predetermined operation corresponds to a time when the state is switched to the lock state even though the drive current which maintains the unlock state is applied is larger than the predetermined value in a case where the time of predetermined operation corresponds to a time of start-up of the internal combustion engine.

During driving, a higher degree of risk is involved in the switch to the lock state against the driver's intention, and therefore the predetermined value is made larger so that the state will not be switched again to the lock state against the intention of the driver.

MODE FOR CARRYING OUT THE INVENTION

Figure 1:
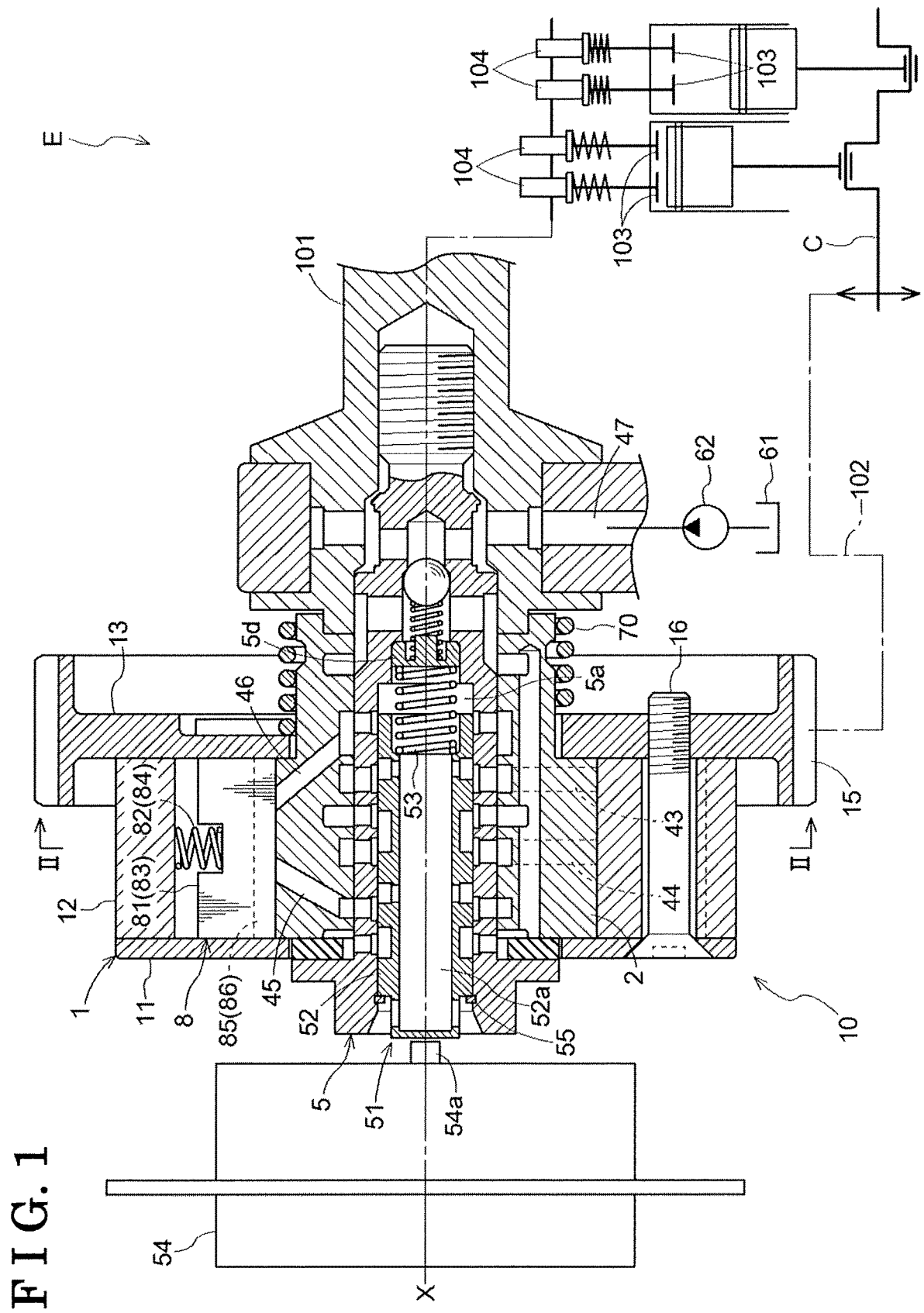
FIG. 1 is a longitudinal sectional-view illustrating configuration of a valve opening and closing timing control apparatus related to an embodiment of the present invention.

1. Configuration of a Valve Opening and Closing Timing Control Apparatus

A valve opening and closing timing control apparatus 10 related to an embodiment of the present invention, which is mounted on an engine E serving as an internal combustion engine, will be described below in detail on the basis of the drawings.

[Overall configuration] The valve opening and closing timing control apparatus 10 includes a housing 1 which rotates synchronously with a crankshaft C, and an inner rotor 2 which is arranged at an inner side of the housing 1 to be coaxial with an axis X of the housing 1 and rotates integrally with a camshaft 101 for valve-opening-and-closing of the engine E. The camshaft 101 is a rotary shaft of a cam 104 controlling opening and closing of an intake valve 103 of the engine E. The crankshaft C is an example of a drive shaft, the housing 1 is an example of a drive-side rotational body, and the inner rotor 2 is an example of a driven-side rotational body.

In a state where the housing 1 and the inner rotor 2 are assembled on each other, a fixing bolt 5 is inserted through a center and a male thread of the fixing bolt 5 and a female thread of the camshaft 101 are threadedly engaged with each other. Accordingly, the fixing bolt 5 is fixed to the camshaft 101 and the inner rotor 2 is fixed relative to the camshaft 101.

The housing 1 is formed by assembling a front plate 11, an outer rotor 12 arranged at an outer side of the inner rotor 2, and a rear plate 13 provided with a timing sprocket 15, to one another with a fastening bolt 16. The inner rotor 2 and the outer rotor 12 are configured to be rotatable about the axis X relative to each other.

A return spring 70 is provided between the housing 1 and the camshaft 101. The return spring 70 applies a biasing force in a direction of rotation about the axis X. The return spring 70 has a function of applying the biasing force such that a relative rotational phase of the inner rotor 2 relative to the housing 1 (which will be also hereinafter referred to simply as "relative rotational phase") reaches from a state of a most retarded angle to a predetermined relative rotational phase that is at an advanced-angle side. In a region where the relative rotational phase is at an advanced-angle side relative to the predetermined relative rotational phase, the return spring 70 has a function of not applying the biasing force.

Figures 2, 3:
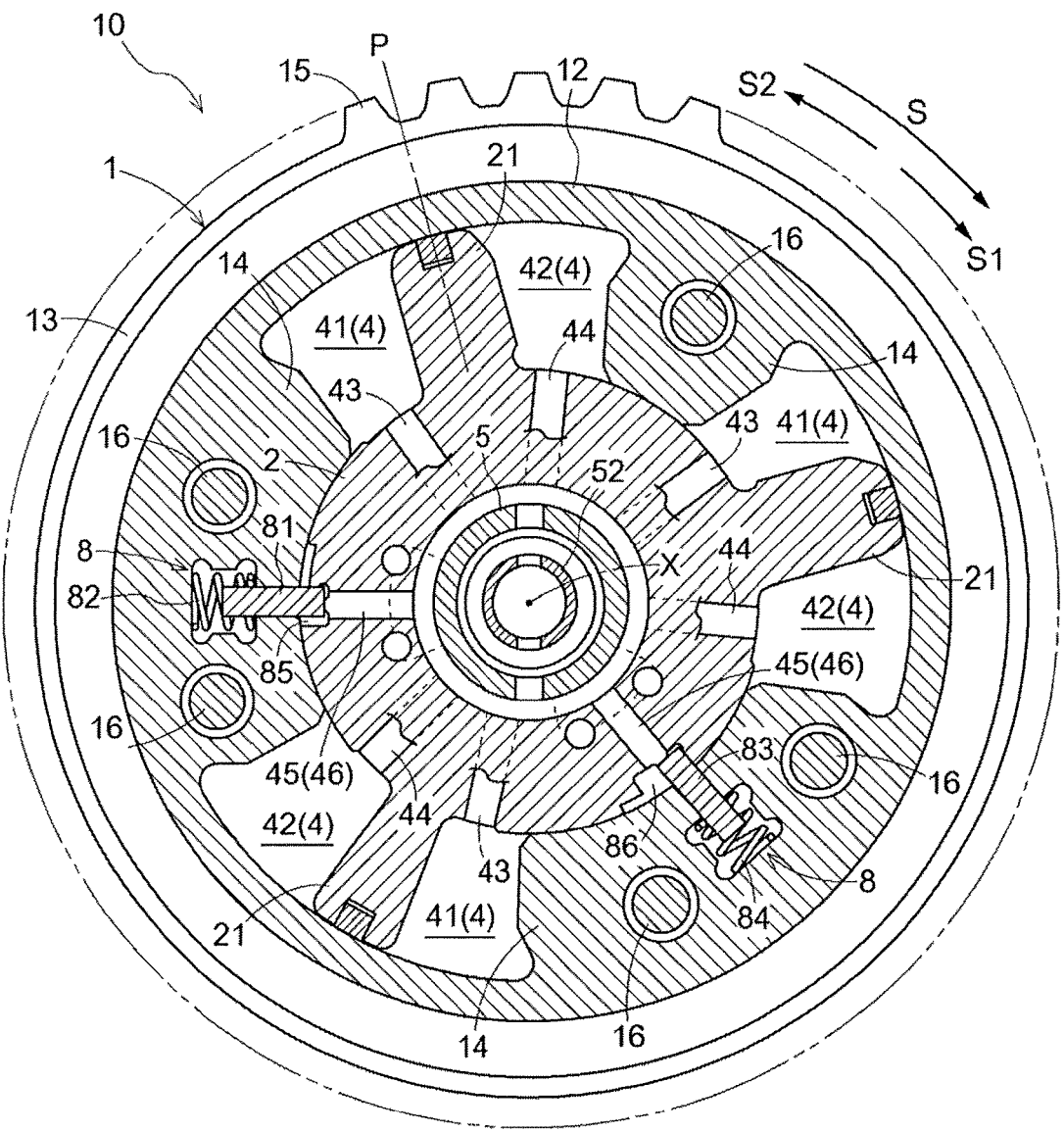
FIG. 2 is a cross-sectional view taken along line II-II of FIG. 1.
FIG. 3 is a diagram illustrating a circulation state of operating oil at each flow passage due to operation of an OCV.

As the crankshaft C rotates and drives, a rotational drive force thereof is transmitted to the timing sprocket 15 via a power transmission member 102, and then the housing 1 rotates and drives in a rotational direction S illustrated in FIG. 2. In association with the rotary drive of the housing 1, the inner rotor 2 rotates and drives in the rotational direction S and the camshaft 101 rotates, and accordingly the cam 104 pushes down the intake valve 103 of the engine E so that the intake valve 103 opens.

As illustrated in FIG. 2, three pieces of protruding portions 14 are provided at the outer rotor 12 in a manner that the protruding portions 14 protrude radially inward and are in contact with an outer circumferential surface of the inner rotor 2. The protruding portions 14 are apart from one another along the rotational direction S. Thus, fluid pressure chambers 4 are formed between the inner rotor 2 and the outer rotor 12. A protruding portion 21 is provided at a portion of the outer circumferential surface of the inner rotor 2, the portion which faces the fluid pressure chamber 4. The fluid pressure chamber 4 is divided into an advanced-angle chamber 41 and a retarded-angle chamber 42.

As the operating oil is supplied to and discharged from the advanced-angle chamber 41 and the retarded-angle chamber 42, or as the supply and discharge is blocked, hydraulic pressure of the operating oil acts on each protruding portion 21 thereby to displace the relative rotational phase in an advanced-angle direction S1 or a retarded-angle direction S2, or to maintain the relative rotational phase at an arbitrary phase. The relative rotational phase in a state where the protruding portion 21 has reached a movable end in the advanced-angle direction S1 is referred to as a most advanced-angle phase and the relative rotational phase in a state where the protruding portion 21 has reached a movable end in the retarded-angle direction S2 is referred to as a most retarded-angle phase. An absolute value of the relative rotational phase and/or a displacement direction of the relative rotational phase are detected by a crank angle sensor and/or a cam angle sensor, which are not shown, and are inputted to an ECU (an electronic control unit) which is not shown.

As illustrated in FIG. 2, the inner rotor 2 is provided with an advanced-angle flow passage 43 that is in communication with the advanced-angle chamber 41, a retarded-angle flow passage 44 that is in communication with the retarded-angle chamber 42, an unlock flow passage 45 through which the operating oil supplied to and discharged from an intermediate lock mechanism 8, which will be described below, flows, and a lock discharge flow passage 46 through which the operating oil discharged from the intermediate lock mechanism 8 to the outside of the valve opening and closing timing control apparatus 10 flows.

[Intermediate lock mechanism] The valve opening and closing timing control apparatus 10 includes the intermediate lock mechanism 8 that restrains or keeps the relative rotational phase in an intermediate lock phase P that is between the most advanced-angle phase and the most retarded-angle phase. As illustrated in FIG. 2, the intermediate lock mechanism 8 includes a first lock member 81, a first spring 82, a second lock member 83, a second spring 84, a first recessed portion 85 and a second recessed portion 86.

Each of the first lock member 81 and the second lock member 83 is formed of a plate-shaped member and is supported to be movable relative to the outer rotor 12 so that each of the first lock member 81 and the second lock member 83, in a posture of being parallel to the axis X, can come close towards a direction of the inner rotor 2 and can be apart from the inner rotor 2. The first recessed portion 85 is defined and formed in a shape of a groove at an outer circumference of the inner rotor 2 along a direction of the axis X. The second recessed portion 86 is defined and formed in a shape of a groove at the outer circumference of the inner rotor 2 along the direction of the axis X.

As illustrated in FIG. 2, in the intermediate lock phase P in a state in which the operating oil is discharged from the first recessed portion 85 and the second recessed portion 86, the first lock member 81 that has been moved towards the inner rotor 2 by the biasing force of the first spring 82 fits in the first recessed portion 85. In addition, the second lock member 83 that has been moved towards the inner rotor 2 by the biasing force of the second spring 84 fits in the second recessed portion 86. Accordingly, the relative rotational phase is restrained or kept at the intermediate lock phase P. The above-described state corresponds to a lock state.

The unlock flow passage 45 is connected to a bottom surface of each of a deep groove of the first recessed portion 85 and a deep groove of the second recessed portion 86. In the lock state, when the operating oil flows through the unlock flow passage 45 and is supplied to the first recessed portion 85 and the second recessed portion 86, the first lock member 81 and the second lock member 83 receive the hydraulic pressure of the operating oil. When the hydraulic pressure exceeds the biasing force of the first spring 82 and the second spring 84, the first lock member 81 and the second lock member 83 move away from the first recessed portion 85 and the second recessed portion 86, respectively, and accordingly an unlock state is established.

Also the lock discharge flow passage 46 is connected to the bottom surface of each of the deep groove of the first recessed portion 85 and the deep groove of the second recessed portion 86. However, the lock discharge flow passage 46 is configured not to allow the operating oil, which is to be supplied to the first recessed portion 85 and the second recessed portion 86, to flow, and is configured only to allow the operating oil, which is to be discharged from the first recessed portion 85 and the second recessed portion 86 to the outside of the valve opening and closing timing control apparatus 10, to flow.

[OCV] As illustrated in FIG. 1, in the present embodiment, an OCV (oil control valve) 51 is arranged at an inner side of the inner rotor 2 to be coaxial with the axis X. The OCV 51 is an example of an electromagnetic valve. The OCV 51 includes a spool 52, a coil spring 53 biasing the spool 52, and an electromagnetic solenoid 54 driving the spool 52. The electromagnetic solenoid 54 is an example of a drive source. The configuration of the electromagnetic solenoid 54 is publicly known, and therefore a detailed explanation will be omitted.

The spool 52 is accommodated in an accommodation space 5a that corresponds to a hole provided at the fixing bolt 5 and including a circular cross section. The spool 52 slides or moves along the direction of the axis X. The spool 52 includes a main discharge flow passage 52a that corresponds to a closed-end hole formed along the direction of the axis X and including a circular cross section.

The coil spring 53 is arranged at an inner part or a back part of the accommodation space 5a and always biases the spool 52 in a direction of the electromagnetic solenoid 54 (the left direction in FIG. 1). The spool 52 is restricted from coming out of the accommodation space 5a by a stopper 55 provided at the accommodation space 5a. A step provided at the main discharge flow passage 52a holds one side of the coil spring 53. A partition 5d is provided, by insertion, at a boundary between the accommodation space 5a, and a closed-end hole formed continuously from the accommodation space 5a and including a small inner diameter. The partition 5d holds the other side of the coil spring 53. As the electromagnetic solenoid 54 is supplied with electricity, a bush pin 54a provided at the electromagnetic solenoid 54 pushes an end portion of the spool 52. As a result, the spool 52 slides in a direction of the cam shaft 101 against the biasing force of the coil spring 53. The OCV 51 is configured to change an applied current to the electromagnetic solenoid 54 from zero (0) to the maximum, thereby adjusting a position of the spool 52. A value of the applied current applied to the electromagnetic solenoid 54 is controlled by the ECU.

The OCV 51 switches among the supply, discharge and retention of the operating oil relative to the advanced-angle chamber 41 and the retarded-angle chamber 42 in accordance with the position of the spool 52. The OCV 51 also switches between the supply and discharge of the operating oil relative to the intermediate lock mechanism 8 in accordance with the position of the spool 52.

[Oil passage configuration] As illustrated in FIG. 1, the operating oil retained in an oil pan 61 is pumped up by an oil pump 62 and flows through a supply flow passage 47. The oil pump 62 is a mechanical oil pump that is driven as the rotational drive force of the crankshaft C is transmitted. The operating oil that has flowed through the supply flow passage 47 is supplied, via the OCV 51, to the advanced-angle flow passage 43, the retarded-angle flow passage 44 and the unlock flow passage 45.

[Operation of OCV] FIG. 3 illustrates an operation configuration of the OCV 51 in a case where the position of the spool 52 changes to W1 to W5 in accordance with the applied current to the electromagnetic solenoid 54. As illustrated in FIG. 3, the valve opening and closing timing control apparatus 10 related to the present embodiment is configured to switch among five states by applying the drive current to the electromagnetic solenoid 54, moving the spool 52 of the OCV 51 along the axis X, and stopping the spool 52 at an intended position. The five states corresponds to "lock to the intermediate lock phase due to a retarded-angle operation (W1)", "retarded-angle operation in the unlock state (W2)", "intermediate phase retention (W3)", "an advanced-angle operation in the unlock state (W4)" and ""lock to the intermediate lock phase due to the advanced-angle operation (W5)".

In a case of the valve opening and closing timing control apparatus 10 which does not include the lock discharge flow passage 46, the OCV 51 is configured to switch among the four states of W1 to W4, of which a detailed explanation will be omitted.

2. Procedure of Re-Setting of Boundary Current

[Overall flow] Next, at the valve opening and closing timing control apparatus 10, procedure will be described for re-setting, that is, setting again, a value of a drive current I near a boundary between the state of the lock to the intermediate lock phase P due to the retarded-angle operation (which will be hereinafter referred to as a retarded-angle lock state) and the state of the retarded-angle operation in the unlock state (which will be hereinafter referred to as a retarded-angle operation state), the value of the drive current I which can maintain or keep the retarded-angle operation state. In addition, procedure will be described for re-setting a value of the drive current I near a boundary between the state of the lock to the intermediate lock phase P due to the advanced-angle operation (which will be hereinafter referred to as an advanced-angle lock state) and the state of the advanced-angle operation in the unlock state (which will be hereinafter referred to as an advanced-angle operation state), the value of the drive current I which can keep or maintain the advanced-angle operation state. Hereinafter, both of the above-stated values of the drive current I will be collectively referred to as "boundary current", the boundary current which keeps the retarded-angle operation state will be referred to as "a retarded-angle-side boundary current $I_{ret}$", and the boundary current which keeps the advanced angle operation state will be referred to as "an advanced-angle-side boundary current $I_{adv}$".

Timings of re-setting the boundary currents include, for example, a time of start-up of the engine E (which will be hereinafter referred to simply as a time of start-up). In addition, the timings at which the boundary currents are re-set include, for example, a case in which the state is switched to the lock state even though the boundary current which has been able to keep the retarded-angle operation state and/or the advanced-angle operation state in the unlock state is applied to the electromagnetic solenoid 54, because the value of the boundary current has changed due to reasons including changes in external environment and/or deterioration of the OCV 51 itself (which will be hereinafter referred to as "a time of occurrence of an unexpected lock"). However, the timings at which the re-setting is performed are not limited to the above-stated two cases. For example, the boundary current may be re-set in an arbitrary case such as in a case where a battery is replaced and/or a case where the vehicle had an inspection. The time of start-up and the time of occurrence of the unexpected lock are examples of "a time of predetermined operation of the internal combustion engine".

Figure 4:
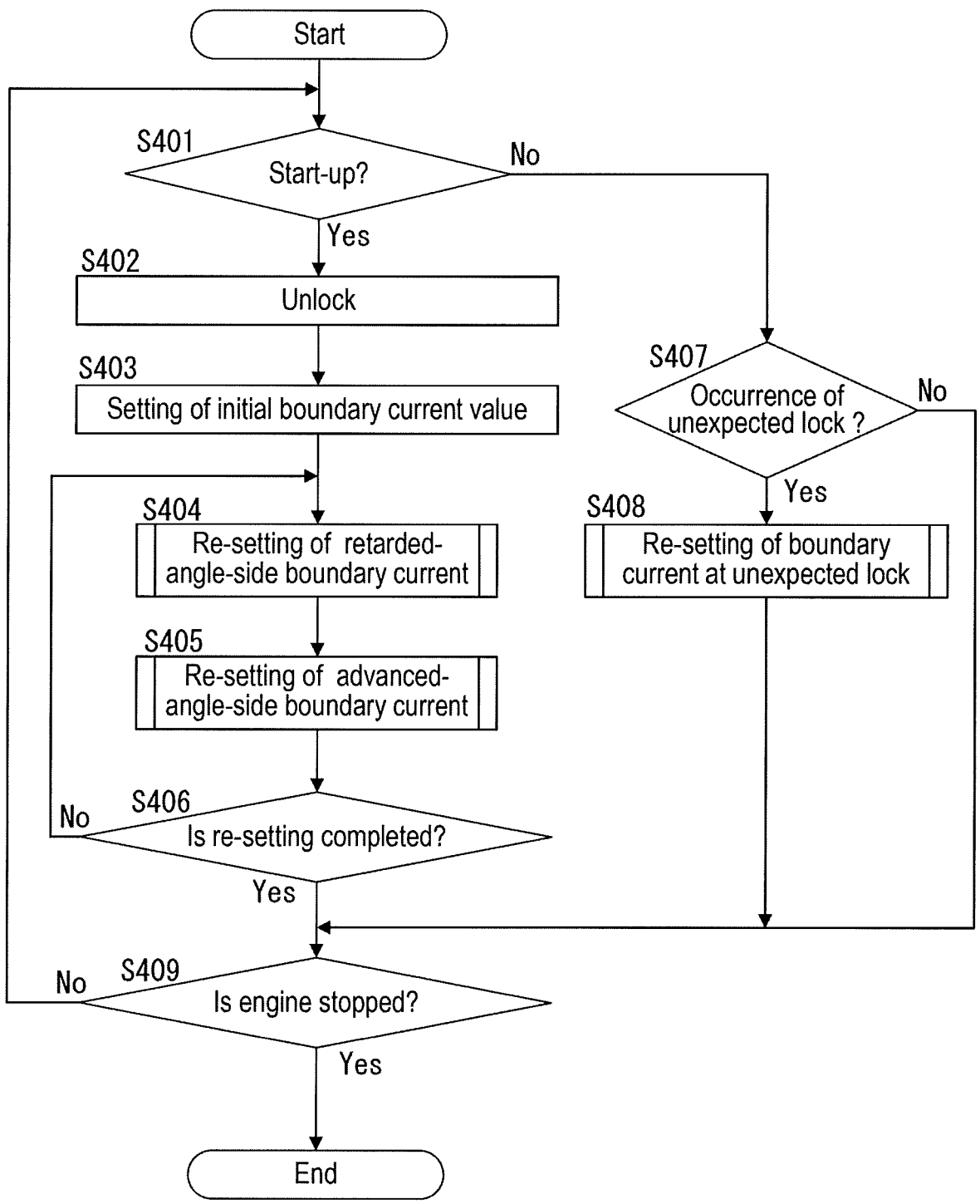
FIG. 4 is a flowchart showing overall procedure of performing re-setting of a boundary current at a time of start-up and at a time of occurrence of an unexpected lock.

FIG. 4 shows a flowchart of an overall procedure of re-setting the boundary current at the time of start-up and at the time of occurrence of the unexpected lock, which are stated above. Hereinafter, in the present application, the control shown in the flowchart is performed by the ECU. At the ECU, it is set in such a manner that a re-setting completion flag of the retarded-angle-side boundary current $I_{ret}$ is 0 before the re-setting at the time of start-up is performed, and the re-setting completion flag of the retarded-angle-side boundary current $I_{ret}$ becomes 1 when the re-setting is completed. Similarly, a re-setting completion flag of the advanced-angle-side boundary current $I_{adv}$ is 0 before the re-setting is performed, and the re-setting completion flag of the advanced-angle-side boundary current $I_{adv}$ becomes 1 when the re-setting is completed. During the re-setting of the boundary current at the time of start-up, a retarded-angle lock flag is 0 when the drive current I is applied to the electromagnetic solenoid 54 and the retarded-angle operation state is maintained, and the retarded-angle lock flag becomes 1 when the state is switched to the retarded-angle lock state. Similarly, an advanced-angle lock flag is 0 when the drive current I is applied to the electromagnetic solenoid 54 and the advanced-angle operation state is maintained, and the advanced-angle lock flag becomes 1 when the state is switched to the advanced-angle lock state.

When the engine E is stopped, the relative rotational phase is in the lock state at the intermediate lock phase P due to the intermediate lock mechanism 8. When an ignition switch of the vehicle is turned on to start up the engine E (Yes at S401), the lock state is continuously maintained because the electromagnetic solenoid 54 is not electrified yet. Thereafter, as the electromagnetic solenoid 54 is electrified and thus the state is switched to the unlock state (S402), a value of an initial boundary current at each of the retarded-angle side and the advanced-angle side is set (S403). The value of the initial boundary current is a value which is able to reliably place the relative rotational phase in the retarded-angle operation state or in the advanced-angle operation state. For example, the value of the initial boundary current may be a value of the boundary current which was set previously and operated normally. Thereafter, a retarded-angle-side boundary current re-setting subroutine (S404) and an advanced-angle-side boundary current re-setting subroutine (S405) are performed. When both re-settings are completed (Yes at S406), the flow of the re-setting is completed. When the re-settings are not completed (No at S406), the subroutines are repeatedly performed until the re-settings are completed.

In a case where it is not at the time of start-up of the engine E (No at S401), the re-setting is not performed until at the time of occurrence of the unexpected lock (No at S407). When the unexpected lock occurs (Yes at S407), an unexpected lock boundary current re-setting subroutine (S408) is performed.

The above-described flow of re-setting is repeated until the ignition switch is turned off and thus the engine E is stopped (No at S409).

Figure 5:
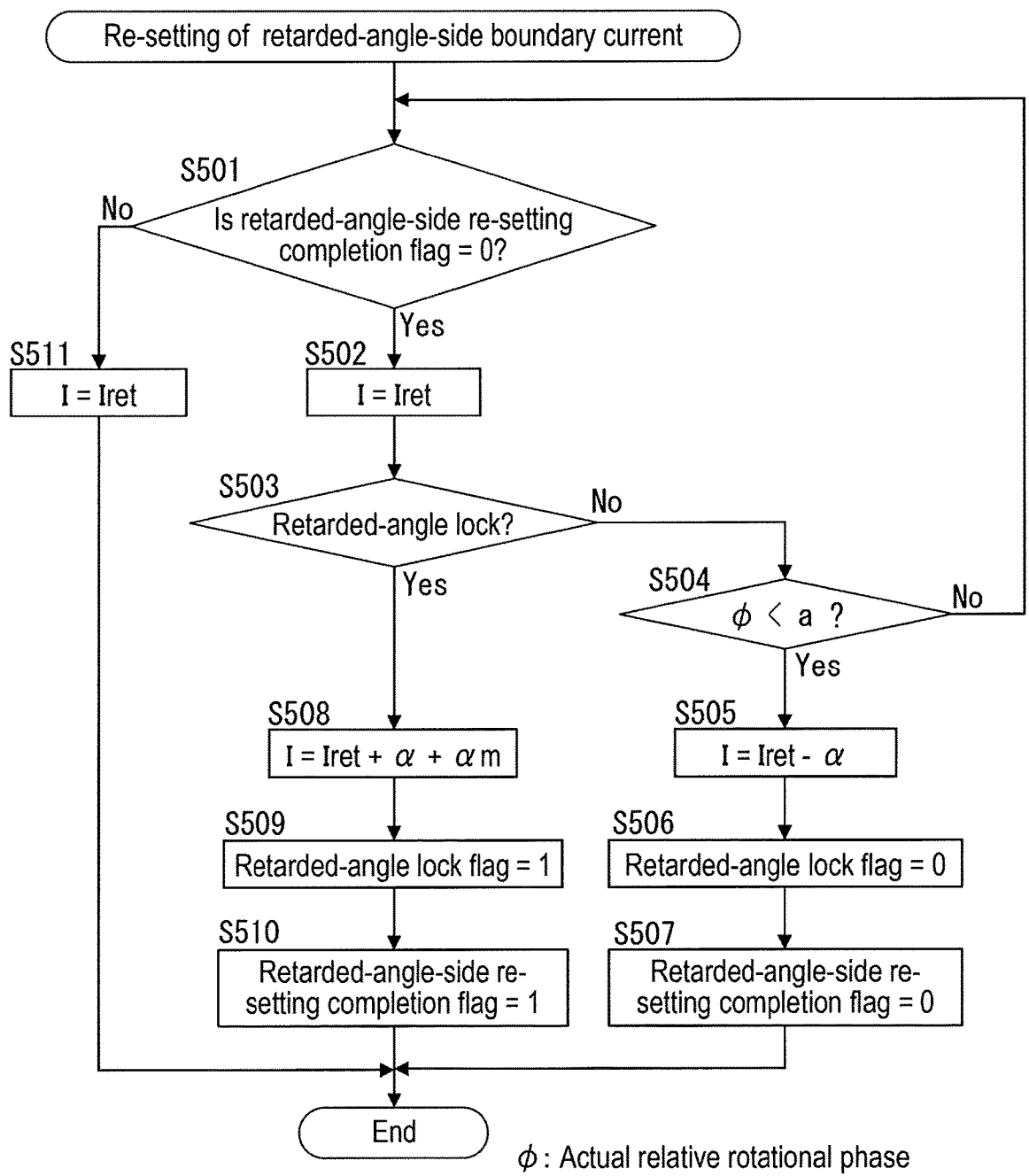
FIG. 5 is a flowchart showing procedure of performing re-setting of a retarded-angle-side boundary current at the time of start-up.

[Retarded-angle-side boundary current re-setting flow]
Next, the retarded-angle-side boundary current re-setting subroutine (S404) will be described. FIG. 5 shows a flowchart of re-setting procedure of the retarded-angle-side boundary current $I_{ret}$ at the time of start-up, and FIG. 7 shows a time chart of an actual relative rotational phase Ø and the drive current I at the re-setting procedure.

Figure 7:
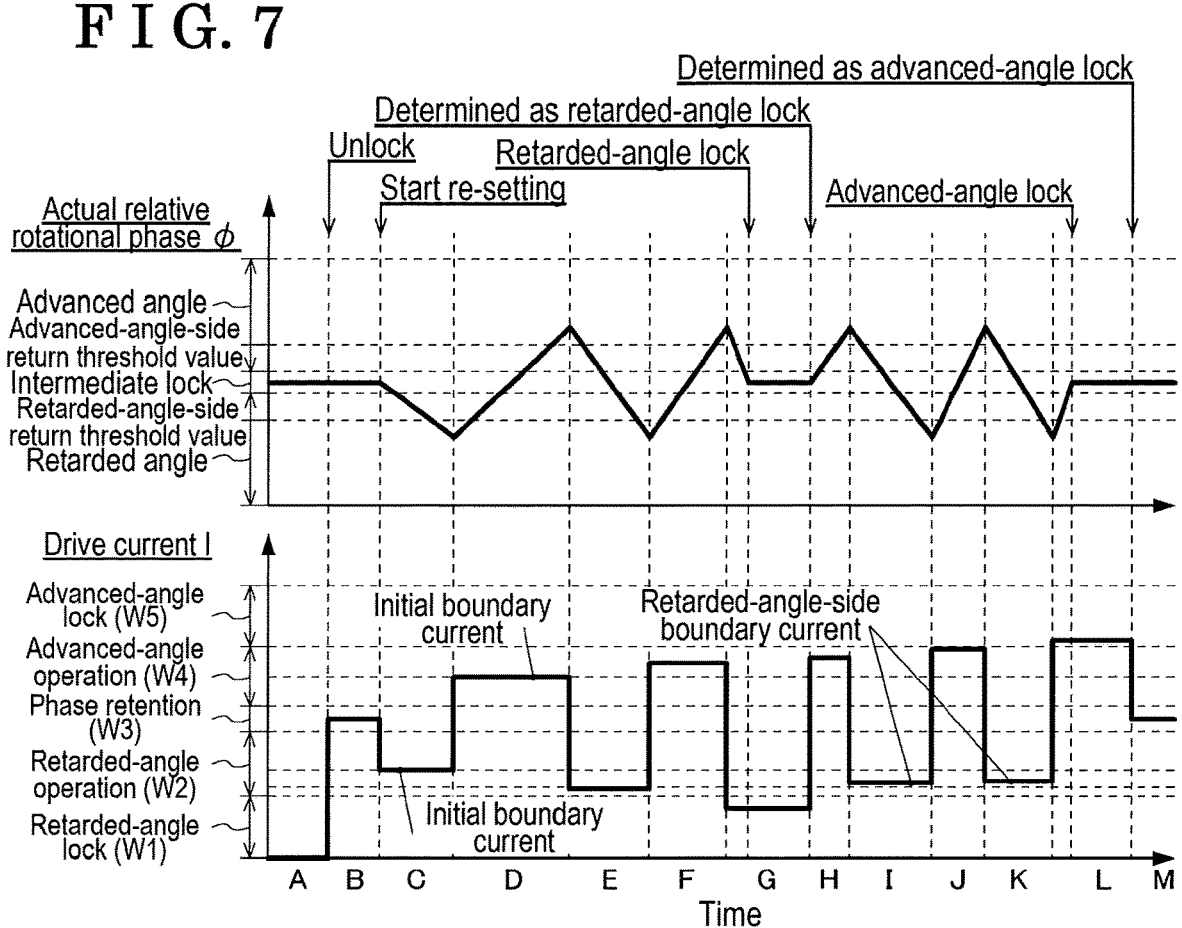
FIG. 7 is a time chart of a relative rotational phase and a drive current, during the re-setting at the time of start-up.

A state A shown in FIG. 7 is a state in which the ignition switch of the vehicle is turned on to start up the engine E (Yes at S401 of FIG. 4). At this time, the electromagnetic solenoid 54 is not energized yet, and the actual relative rotational phase Ø is the intermediate lock phase P and the lock state is maintained. Thereafter, when such a drive current I that makes the OCV 51 be in the state of phase retention (W3) is applied to the electromagnetic solenoid 54, the intermediate lock mechanism 8 is switched to the unlock state (S402). However, the actual relative rotational phase Ø is maintained within a range of the intermediate lock phase P (to be precise, within a range of ±3CA (crank angle)) (a state B of FIG. 7).

Next, the initial boundary current (which will be hereinafter referred to simply as an initial current) in each of the retarded-angle operation state and the advanced-angle operation state is set as described above by the ECU (S403), and the retarded-angle-side boundary current re-setting subroutine (S404) is started.

In the retarded-angle-side boundary current re-setting subroutine, first, it is confirmed on the basis of the re-setting completion flag of the retarded-angle-side boundary current whether or not the re-setting of the retarded-angle-side boundary current $I_{ret}$ is already completed. When the flag is 0 (Yes at S501 of FIG. 5), the initial current which causes the retarded-angle operation state is applied, as the drive current I, to the electromagnetic solenoid 54 (S502). In a case where the state is not switched to the lock state by the application of the initial current (No at S503), the actual relative rotational phase Ø is displaced in the retarded-angle direction S2 from the intermediate lock phase P and the state W2 is established as shown in a state C of FIG. 7.

When the actual relative rotational phase Ø is at the advanced-angle side relative to a retarded-angle-side return threshold value a (No at S504), the control returns to the beginning of the retarded-angle-side boundary current re-setting subroutine and the above-described flow is repeated. During the repetition of the flow, the actual relative rotational phase Ø is displaced to the retarded angle side relative to the retarded-angle-side return threshold value a. When the actual relative rotational phase Ø is displaced to the retarded angle side relative to the retarded-angle-side return threshold value a (Yes at S504), the ECU determines that the state was not switched to the lock state by the initial current, that is, the ECU determines that re-setting of the retarded-angle-side boundary current $I_{ret}$ is not completed. Then, the ECU sets a value of the drive current I, which will be applied to the electromagnetic solenoid 54 the next time to re-set the retarded-angle-side boundary current $I_{ret}$, to a value (a second term electric current) that is obtained by subtracting a retarded-angle-side electric current change amount α from the initial current (S505). For example, the retarded-angle-side electric current change amount α is 5 mA. In the present embodiment, the second term electric current is an electric current which switches the state into the lock state more easily compared to the initial current. The subroutine (S404) ends while the retarded-angle lock flag remaining at 0 (S506) and the re-setting completion flag of the retarded-angle-side boundary current $I_{ret}$ also remaining at 0.

Next, the advanced-angle-side boundary current re-setting subroutine (S405 of FIG. 4) is performed. This subroutine will be described in detail later. Regardless of a result of performing the subroutine, the re-setting of the retarded-angle-side boundary current $I_{ret}$ is not completed yet, and therefore the re-settings are not completed (No at S406). Thus, after the advanced-angle-side boundary current re-setting subroutine is performed, the retarded-angle-side boundary current re-setting subroutine (S404) is performed again.

When the retarded-angle-side boundary current re-setting subroutine is performed at the second time, the second term electric current is applied, as the drive current I, to the electromagnetic solenoid 54 (S502). In a case where the state is still not switched to the lock state (No at S503), the actual relative rotational phase Ø is displaced in the retarded-angle direction S2 from the intermediate lock phase P and the state W2 is established as shown in a state E of FIG. 7.

In a case where the actual relative rotational phase Ø is displaced to the retarded-angle side relative to the retarded-angle-side return threshold value a (Yes at S504), the ECU determines that the state is not switched to the lock state by the second term current and that re-setting of the retarded-angle-side boundary current $I_{ret}$ is not completed. Then, the ECU sets a value of the drive current I, which will be applied to the electromagnetic solenoid 54 the third time to re-set the retarded-angle-side boundary current $I_{ret}$, to a value (a third term electric current) that is obtained by further subtracting the retarded-angle-side electric current change amount α from the second term current (S505). Then, the ECU ends the retarded-angle-side boundary current re-setting subroutine.

Next, after the advanced-angle-side boundary current re-setting subroutine (S405) is performed again, the third term electric current is applied as the drive current I to the electromagnetic solenoid 54 (S502). When the third term electric current is applied, the state changed to the lock state (Yes at S503), and accordingly the actual relative rotational phase Ø is restrained in the intermediate lock phase P and the state W1 is established as in a state G of FIG. 7. Consequently, it is found that the boundary current at which the W2 and the W1 are switched exists between the second term electric current and the third term electric current. It is determined that the state has switched to the lock state if the actual relative rotational phase Ø is not displaced towards the retarded-angle side relative to the retarded-angle-side return threshold value a for a predetermined time period after the third term electric current is applied to the electromagnetic solenoid 54 (refer to FIG. 7).

On the basis of the above-described result, the second term electric current, which corresponds to the drive current I immediately before the switch from the unlock state to the lock state, may be set as the boundary current. However, in a case where the second term electric current is closer to the boundary between the W2 and the W1 than the third term electric current, the boundary current may change again during the operation of the engine E even if the boundary current is re-set this time. In the present embodiment, therefore, a value obtained by adding the retarded-angle-side electric current change amount α to the third term electric current (=the second term current will be obtained) and further adding thereto a retarded-angle-side electric current margin $\alpha_m$ is set as the retarded-angle-side boundary current $I_{ret}$ (S508). In consequence, the state has changed to the retarded-angle lock state and the re-setting of the retarded-angle-side boundary current $I_{ret}$ is completed. Accordingly, the retarded-angle lock flag is turned to be 1 (S509) and also the re-setting completion flag of the retarded-angle-side boundary current $I_{ret}$ is turned to be 1 (S510), and the subroutine (S404) ends. The sum of the retarded-angle-side electric current change amount $\alpha$ and the retarded-angle-side electric current margin $\alpha_m$ is an example of a predetermined value.

As in a state H of FIG. 7, even though the re-setting of the retarded-angle-side boundary current $I_{ret}$ is completed, the retarded-angle-side boundary current re-setting subroutine needs to be continued and performed until the advanced-angle-side boundary current re-setting subroutine ends. In this case, the re-setting completion flag of the retarded-angle-side boundary current $I_{ret}$ is already 1 (No at S501), the retarded-angle-side boundary current $I_{ret}$ is applied as the drive current I (S511 of FIG. 5, a state I and a state K of FIG. 7).

Figure 6:
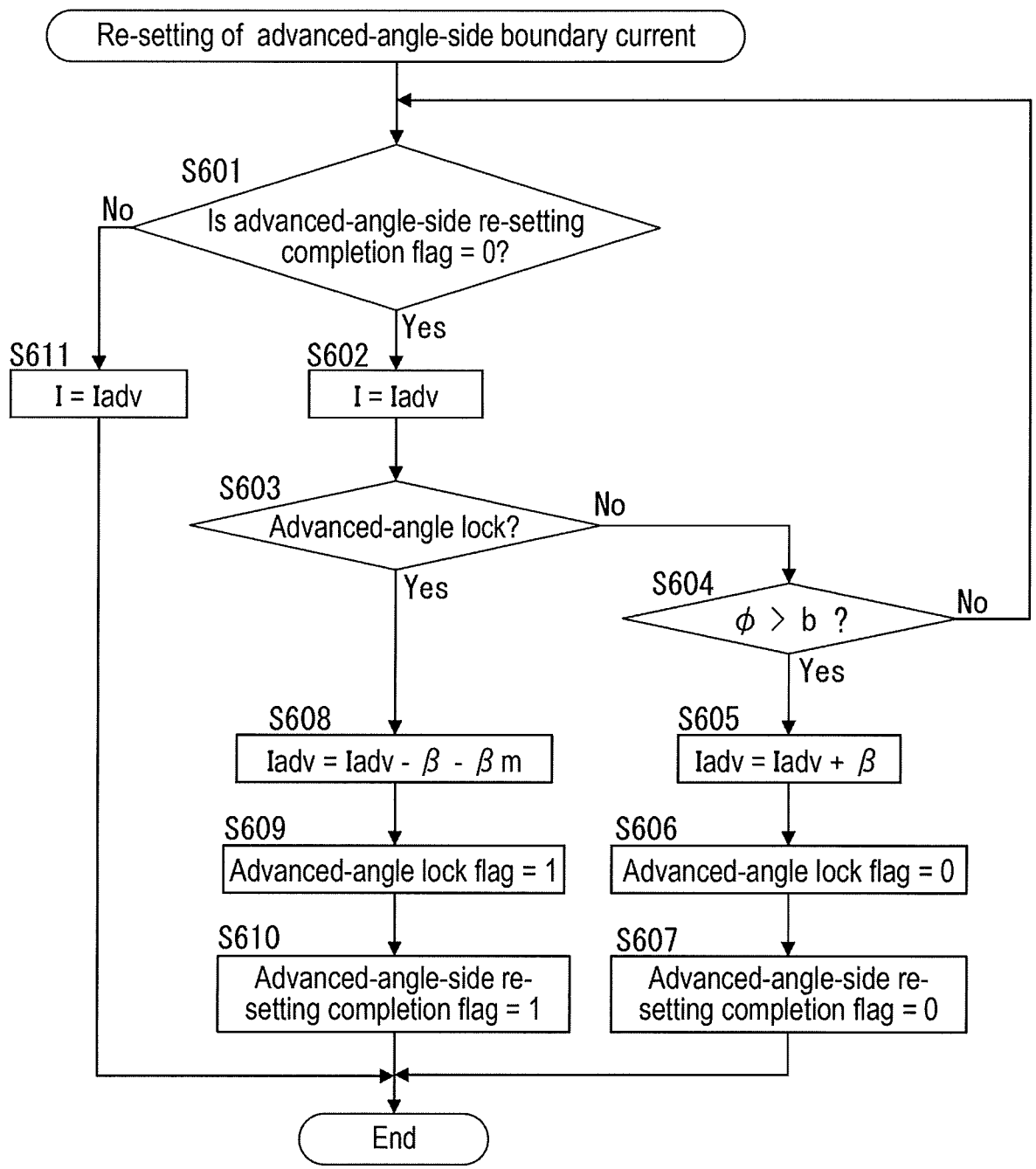
FIG. 6 is a flowchart showing procedure of performing re-setting of an advanced-angle-side boundary current at the time of start-up.

[Advanced-angle-side boundary current re-setting flow]
Next, the advanced-angle-side boundary current re-setting subroutine (S405 of FIG. 4) will be described. FIG. 6 shows a flowchart of re-setting procedure of the advanced-angle-side boundary current $I_{adv}$ at the time of start-up, and FIG. 7 shows the time chart of the actual relative rotational phase Ø and the drive current I at the re-setting procedure.

As in the state C of FIG. 7, after the actual relative rotational phase Ø is displaced in the retarded-angle direction S2 from the intermediate lock phase P (the state W2) and the retarded-angle-side boundary current re-setting subroutine ends, the advanced-angle-side boundary current re-setting subroutine is performed. In the subroutine, first, it is confirmed on the basis of the re-setting completion flag of the advanced-angle-side boundary current whether or not the re-setting of the advanced-angle-side boundary current $I_{adv}$ is already completed. When the flag is 0 (Yes at S601 of FIG. 6), the initial current which is already set and causes the advanced-angle operation state is applied, as the drive current I, to the electromagnetic solenoid 54 (S602, the state D of FIG. 7). In consequence, the actual relative rotational phase Ø is displaced towards the advanced-angle side. In a case where the state is not switched to the lock state by the application of the initial current (No. at S603), the actual relative rotational phase Ø passes beyond the intermediate lock phase P, and reaches the advanced-angle side and comes to be in the state W4.

When the actual relative rotational phase Ø is at the retarded-angle side relative to an advanced-angle-side return threshold value b (No at S604), the control returns to the beginning of the subroutine and the above-described flow is repeated. During the repetition of the flow, the actual relative rotational phase Ø is displaced to the advanced angle side relative to the advanced-angle-side return threshold value b. When the actual relative rotational phase Ø is displaced to the advanced angle side relative to the advanced-angle-side return threshold value b (Yes at S604), the ECU determines that the state was not switched to the lock state by the initial current, that is, the ECU determines that re-setting of the advanced-angle-side boundary current $I_{adv}$ is not completed. Then, the ECU sets a value of the drive current I, which will be applied to the electromagnetic solenoid 54 the next time to re-set the advanced-angle-side boundary current $I_{adv}$, to a value (the second term electric current) that is obtained by adding an advanced-angle-side electric current change amount β to the initial current (S605). For example, the advanced-angle-side electric current change amount β is 5 mA. In the present embodiment, the second term electric current is an electric current which switches the state into the lock state more easily compared to the initial current. The subroutine (S405) ends while the advanced-angle lock flag remaining at 0 (S606) and the re-setting completion flag of the advanced-angle-side boundary current $I_{adv}$ also remaining at 0 (S607).

Next, the above-described retarded-angle-side boundary current re-setting subroutine is performed. Regardless of a result of performing the subroutine, the re-setting of the advanced-angle-side boundary current $I_{adv}$ is not completed yet, and therefore the re-settings are not completed (No at S406). Thus, after the retarded-angle-side boundary current re-setting subroutine is performed, the advanced-angle-side boundary current re-setting subroutine is performed again.

When the advanced-angle-side boundary current re-setting subroutine is performed at the second time, the second term electric current is applied, as the drive current I, to the electromagnetic solenoid 54 (S602). In a case where the state is still not switched to the lock state (No at S603), the actual relative rotational phase Ø is displaced in the advanced-angle direction S1 from the intermediate lock phase P and the state W4 is established as shown in a state F of FIG. 7.

In a case where the actual relative rotational phase Ø is displaced to the advanced-angle side relative to the advanced-angle-side return threshold value b (Yes at S604), the ECU determines that the state is not switched to the lock state by the second term current and that re-setting of the advanced-angle-side boundary current $I_{adv}$ is not completed. Then, the ECU sets a value of the drive current I, which will be applied to the electromagnetic solenoid 54 the third time to re-set the advanced-angle-side boundary current $I_{adv}$, to a value (the third term electric current) that is obtained by further adding the advanced-angle-side electric current change amount β to the second term current (S605). Then, the ECU ends the advanced-angle-side boundary current re-setting subroutine.

As described above, the retarded-angle-side boundary current re-setting subroutine and the advanced-angle-side boundary current re-setting subroutine are performed alternately with each other. Then, in the advanced-angle-side boundary current re-setting subroutine, the state did not change to the lock state even though a fourth term electric current, which is obtained by further adding the advanced-angle-side electric current change amount β to the third term current, was applied to the electromagnetic solenoid 54 as the drive current I as indicated in a state J of FIG. 7. As indicated in a state L of FIG. 7, the state changed to the lock state when a fifth term electric current, which is obtained by further adding the advanced-angle-side electric current change amount β to the fourth term current, was applied to the electromagnetic solenoid 54 as the drive current I (Yes at S603), and accordingly the actual relative rotational phase Ø is restrained at the intermediate lock phase P and the state W5 is established. Consequently, it is found that the boundary current at which the W4 and the W5 are switched exists between the fourth term electric current and the fifth term electric current. It is determined that the state has switched to the lock state if the actual relative rotational phase Ø is not displaced towards the advanced-angle side relative to the advanced-angle-side return threshold value b for a predetermined time period after the fifth term electric current is applied to the electromagnetic solenoid 54 (refer to FIG. 7).

On the basis of the above-described result, the fourth term electric current corresponding to the drive current I that is immediately before the switch from the unlock state to the lock state may be set as the boundary current. However, in a case where the fourth term electric current is closer to the boundary between the W5 and the W4 than the fifth term electric current, the boundary current may change again during the operation of the engine E even if the advanced-angle-side boundary current $I_{adv}$ is re-set this time. In the present embodiment, therefore, a value obtained by subtracting the advanced-angle-side electric current change amount β from the fifth term electric current (=the fourth term current will be obtained) and further subtracting therefrom an advanced-angle-side electric current margin $β_m$ is set as the advanced-angle-side boundary current $I_{adv}$ (S608). In consequence, the state has changed to the advanced-angle lock state and the re-setting of the advanced-angle-side boundary current $I_{adv}$ is completed. Thus, the advanced-angle lock flag is turned to be 1 (S609) and also the re-setting completion flag of the advanced-angle-side boundary current $I_{adv}$ is turned to be 1 (S610), and the advanced-angle-side boundary current re-setting subroutine ends. The sum of the advanced-angle-side electric current change amount β and the advanced-angle-side electric current margin $β_m$ is an example of the predetermined value.

Because the retarded-angle-side boundary current $I_{ret}$ was already decided at the time of the state G of FIG. 7, and the re-setting completion flag of the retarded-angle-side boundary current $I_{ret}$ has been 1, the retarded-angle-side boundary current re-setting subroutine is also completed. The re-setting flow is once ended (Yes at S406 of FIG. 4) because the re-settings of the boundary currents at both retarded-angle side and the advanced-angle side are completed. After completion of the re-setting flow, as shown in a state M of FIG. 7, the actual relative rotational phase Ø is displaced to the intermediate lock phase P while being unlocked, and this state is maintained.

The flow of re-setting is repeated until the ignition switch is turned off and the engine E stops (No at S409). However, in a case where it is not at the time of start-up of the engine E (No at S401), the re-setting of the boundary current is not performed until the time of occurrence of the unexpected lock (No at S407).

As described above, even in a case where the changes have occurred to the boundary current due to the reasons including the change in the external environment and/or the deterioration of the OCV 51, by re-setting the boundary current at the time of start-up of the engine E, such a drive current I that can maintain the unlock state as close as possible to the boundary where the state is switched to the lock state can be set as the boundary current. As a result, the control of switching among the five states can be performed reliably.

In addition, by displacing the actual relative rotational phase Ø to the retarded-angle side and to the advanced-angle side alternately with each other, the re-setting of the retarded-angle-side boundary current $I_{ret}$ and the re-setting of the advanced-angle-side boundary current $I_{adv}$ can be performed in a parallel way, and accordingly a time period until the re-settings are completed can be shortened compared to a case in which each re-setting is independently performed. Further, in the unlock state, the drive current I is changed from the initial current by the predetermined magnitude (the retarded-angle-side electric current change amount α and the advanced-angle-side electric current change amount β) so that the state comes close to the lock state, and then, when the state is switched to the lock state, the boundary current is defined with consideration of the margin relative to the drive current I which is applied to the electromagnetic solenoid 54 immediately before the switch of the states. Consequently, ranges of the drive current I in which the retarded-angle operation in the unlock state and the advanced-angle operation in the unlock state can be performed are widened or increased, thereby enhancing a control performance of the OCV 51.

Figure 8:
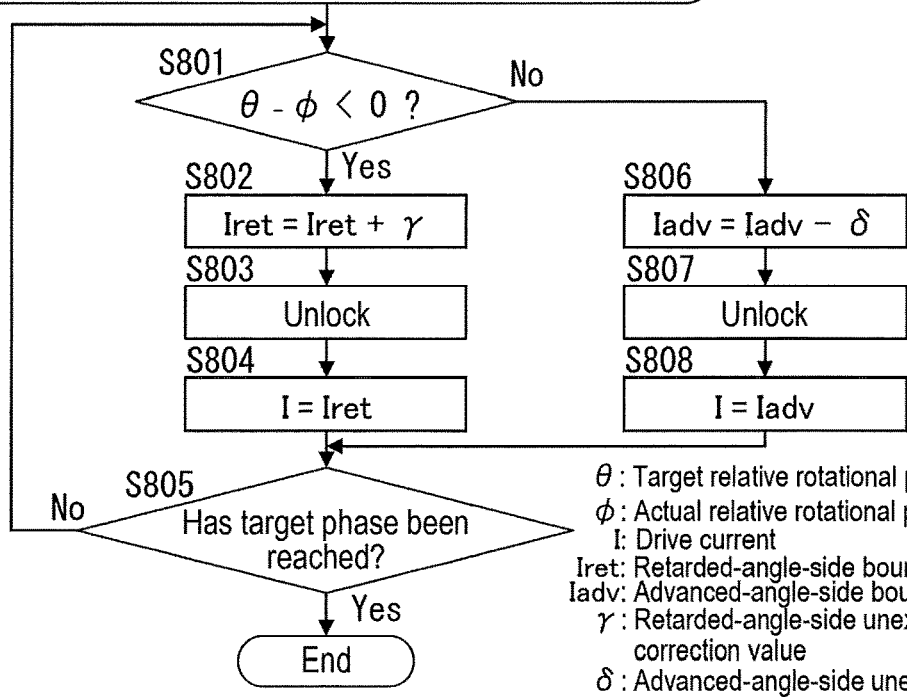
FIG. 8 is a flowchart showing procedure for performing the re-setting of the retarded-angle-side boundary current at the time of unexpected lock.

[Boundary current re-setting flow at the time of occurrence of the unexpected lock] Next, the unexpected lock boundary current re-setting subroutine (S408 of FIG. 4) is described. As shown in FIG. 4, the time of occurrence of the unexpected lock is not the time of start-up of the engine E (No at S401), and thus the unexpected lock occurs during running of the vehicle, for example. FIG. 8 shows a flowchart of procedure of re-setting the retarded-angle-side boundary current $I_{ret}$ at the time of occurrence of the unexpected lock, and FIG. 9 shows a time chart of the actual relative rotational phase Ø and the drive current I at the re-setting procedure.

Figure 9:
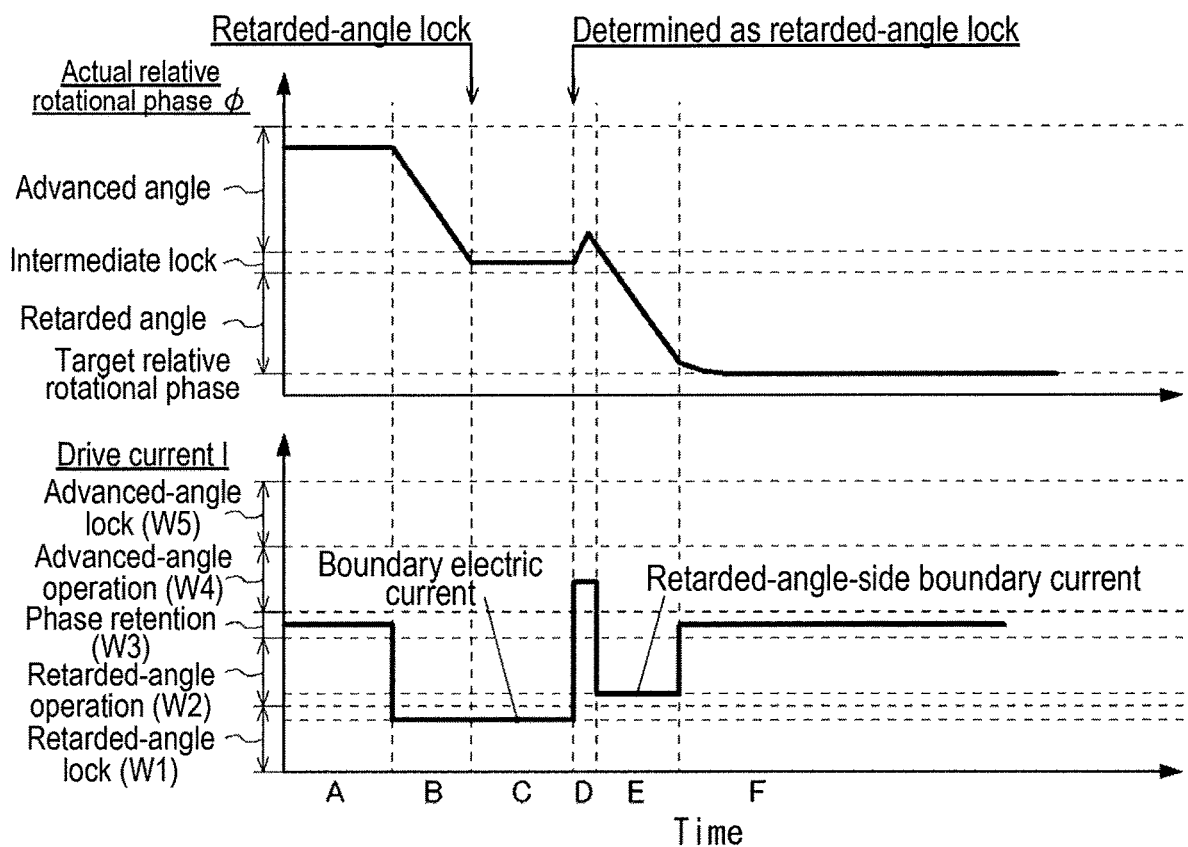
FIG. 9 is a time chart of the relative rotational phase and the drive current, during the re-setting at the time of unexpected lock.

As shown in FIG. 9, in a state A, the actual relative rotational phase Ø is at the advanced-angle side relative to the intermediate lock phase P and the phase is retained not to be displaced (the state W3). In order to displace therefrom the actual relative rotational phase Ø to the retarded-angle side across or beyond the intermediate lock phase P, the drive current I which causes the retarded-angle operation state (W2) (the drive current I which will be hereinafter referred to as an original retarded-angle-side boundary current) was applied to the electromagnetic solenoid 54 (a state B of FIG. 9). However, the actual relative rotational phase Ø remained restrained in the intermediate lock phase P after a predetermined time period passed and did not reach an intended phase at the retarded-angle side (a state C of FIG. 9). Thus, the ECU determines that the OCV 51 is in the retarded-angle lock state (W1) but not in the retarded-angle operation state (W2). This may be because a value of the original retarded-angle-side boundary current comes to be in the control range of the retarded-angle lock state because the retarded-angle-side boundary current $I_{ret}$ has changed to an increase side due to the reasons including the changes in external environment and/or the deterioration of the OCV 51 itself.

Thus, in accordance with the procedure shown in FIG. 8, the value of the original retarded-angle-side boundary current is set again to be at a new value of the retarded-angle-side boundary current $I_{ret}$ which reliably causes the retarded-angle operation state. First, after a predetermined time period has passed after the intermediate lock phase P occurred unexpectedly, a comparison in size is performed between a target relative rotational phase θ and the current actual relative rotational phase (=the intermediate lock phase P) Ø. In a case where the target relative rotational phase θ is larger (No at S801), the ECU determines that the relative rotational phase was initially at the retarded-angle side relative to the intermediate lock phase P and did not reach the advanced-angle side while being displaced towards the advanced-angle side, and that the lock state is established in the intermediate lock phase P. In a case where the target relative rotational phase θ is smaller (Yes at S801), the ECU determines that the relative rotational phase was initially at the advanced-angle side relative to the intermediate lock phase P and did not reach the retarded-angle side while being displaced towards the retarded-angle side, and that the lock state is established in the intermediate lock phase P. FIG. 9 shows the latter case.

Hereafter, with respect to the original retarded-angle-side boundary current, the value of the drive current I at which the state will not be changed again to the lock state needs to be re-set as the new retarded-angle-side boundary current $I_{ret}$, and the new retarded-angle-side boundary current $I_{ret}$ needs to be applied to the electromagnetic solenoid 54. Therefore, at the time of unexpected lock, the new retarded-angle-side boundary current $I_{ret}$ is obtained by adding a retarded-angle-side unexpected lock correction value γ to the original retarded-angle-side boundary current that corresponds to the retarded-angle-side boundary current $I_{ret}$ re-set at the time of start-up (S802). The retarded-angle-side unexpected lock correction value γ is a value that is even larger than the sum of the retarded-angle-side electric current change amount α and the retarded-angle-side electric current margin $α_m$.

In parallel with the re-setting of the retarded-angle-side boundary current $I_{ret}$, the lock state needs to be switched to the unlock state. This time, however, the first lock member 81 of the intermediate lock mechanism 8 is pushed against a wall surface, at the advanced-angle side, of the first recessed portion 85 because the state was switched to the lock state while the actual relative rotational phase Ø is being displaced towards the retarded-angle direction S2. Accordingly, even if such a drive current I that holds the phase (W3) is applied to the electromagnetic solenoid 54, the operating oil is simply supplied from the unlock flow passage 45 and the first lock member 81 may not come off smoothly from the first recessed portion 85 due to a frictional force between the first lock member 81 and the wall surface at the advanced angle side. Therefore, the lock may be released while the actual relative rotational phase Ø is being displaced in a direction in which the first lock member 81 comes apart from the wall surface, at the advanced-angle side, of the first recessed portion 85. In a case of the present embodiment, when such a drive current I that causes the advanced-angle operation state (W4) is applied to the electromagnetic solenoid 54, the first lock member 81 can be taken out while the first lock member 81 is being separated from the wall surface of the advanced-angle side of the first recessed portion 85 (S803, a state D of FIG. 9).

Next, the retarded-angle-side boundary current $I_{ret}$ which was re-set again for the target relative rotational phase θ was applied to the electromagnetic solenoid 54 (S804), and the target relative rotational phase θ was reached (Yes at S805, a state E of FIG. 9) without being switched to the lock state in the intermediate lock phase P. After reaching the target relative rotational phase θ, the phase is maintained as shown in a state F of FIG. 9.

Consequently, for example, during the running of the vehicle, even in a case in which the state is switched to the lock state even though the boundary current which has been able to keep the retarded-angle operation state and/or the advanced-angle operation state in the unlock state is applied to the electromagnetic solenoid 54, because the value of the boundary current has changed due to the reasons including the changes in external environment and/or the deterioration of the OCV 51 itself, it is possible that the new retarded-angle-side boundary current Iret is re-set quickly and the target relative rotational phase θ is reached.

In the present embodiment, re-setting of the retarded-angle-side boundary current $I_{ret}$ is described. However, as shown by S806 to S808 of FIG. 8, a similar manner applies to the advanced-angle-side boundary current $I_{adv}$. Even in a case where the state is switched to the unexpected lock state during the displacement of the actual relative rotational phase Ø in the advanced-angle direction S1, the advanced-angle-side boundary current $I_{adv}$ can be re-set quickly and the target relative rotational phase θ can be reached smoothly.

INDUSTRIAL APPLICABILITY

The present invention can be used for a valve opening and closing timing control apparatus which controls a relative rotational phase of a driven-side rotational body relative to a drive-side rotational body which rotates synchronously with a crankshaft of an internal combustion engine.

EXPLANATION OF REFERENCE NUMERALS 1 housing (drive-side rotational body)
2 inner rotor (driven-side rotational body)
8 intermediate lock mechanism
10 valve opening and closing timing control apparatus
51 OCV (electromagnetic valve)
52 spool
54 electromagnetic solenoid (drive source)
101 camshaft
C crankshaft (drive shaft)
E engine (internal combustion engine)
$I_{adv}$ advanced-angle-side boundary current (drive boundary current)
$I_{ret}$ retarded-angle-side boundary current (boundary current)
P intermediate lock phase
X axis

The invention claimed is:

1. A valve opening and closing timing control apparatus comprising:
   a drive-side rotational body which rotates synchronously with a drive shaft of an internal combustion engine;
   a driven-side rotational body which is arranged at an inner side of the drive-side rotational body to be coaxial with an axis of the drive-side rotational body and rotates integrally with a camshaft for valve-opening-and-closing of the internal combustion engine;
   an intermediate lock mechanism which selectively switches between a lock state where displacement of a relative rotational phase of the driven-side rotational body relative to the drive-side rotational body is restrained by an operating oil supplied in an intermediate lock phase existing between a most advanced-angle phase of the relative rotational phase and a most retarded-angle phase of the relative rotational phase, and an unlock state where the lock state is released; and
   an electromagnetic valve at which a position of a spool is changed when a drive current applied to a drive source changes, and the operating oil is selectively supplied or discharged in accordance with the position of the spool such that the relative rotational phase is displaced in an advanced-angle direction or a retarded-angle direction, the electromagnetic valve selectively switching a supply and discharge of the operating oil to and from the intermediate lock mechanism, wherein
   a value of the drive current at which the lock state is switched to the unlocked state and the unlock state is maintained is defined as a value of a boundary current whose initial value is set previously, and
   at a time of predetermined operation of the internal combustion engine, a value of the drive current which differs, by a predetermined value, from a value of the drive current at a time when the unlock state was switched to the lock state due to a change of the drive current, and which maintains the unlock state, is re-set, by an ECU, as the value of the boundary current.

2. The valve opening and closing timing control apparatus according to claim 1, wherein the drive current is changed in such a manner that an advanced-angle displacement and a retarded-angle displacement occur alternately with each other, the relative rotational phase is displaced in the advanced-angle direction across the intermediate lock phase in the advanced-angle displacement, and the relative rotational phase is displaced in the retarded-angle direction across the intermediate lock phase in the retarded-angle displacement.

3. The valve opening and closing timing control apparatus according to claim 2, wherein, in a case where at least one of the advanced-angle displacement and the retarded-angle displacement occurs a plurality of times, values of the drive current when being displaced in a same direction twice consecutively are set in such a manner that a latter value of the drive current is closer to the value of the drive current at which the lock state is switched to, than a former value of the drive current.

4. The valve opening and closing timing control apparatus according to claim 2, wherein, in a case where the lock state is switched to at a time of either the advanced-angle displacement or the retarded-angle displacement, a value of the drive current which is to be applied subsequently at a time of displacement in the direction in which the lock state is switched to corresponds to the boundary current.

5. The valve opening and closing timing control apparatus according to claim 1, wherein the time of predetermined operation corresponds to a time of start-up of the internal combustion engine.

6. The valve opening and closing timing control apparatus according to claim 1, wherein the time of predetermined operation corresponds to a time when the lock state is switched to even though the drive current which maintains the unlock state is applied.

7. The valve opening and closing timing control apparatus according to claim 1, wherein the predetermined value in a case where the time of predetermined operation corresponds to a time when the lock state is switched to even though the drive current which maintains the unlock state is applied is larger than the predetermined value in a case where the time of predetermined operation corresponds to a time of start-up of the internal combustion engine.

* * * * *